(12) United States Patent
Tanaka et al.

(10) Patent No.: US 8,414,021 B2
(45) Date of Patent: Apr. 9, 2013

(54) HEAD-PROTECTING AIRBAG APPARATUS

(75) Inventors: Motoyuki Tanaka, Kiyosu (JP); Jun Sato, Kiyosu (JP); Yushio Mizuno, Kiyosu (JP); Yasuo Ochiai, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/193,111

(22) Filed: Jul. 28, 2011

(65) Prior Publication Data

US 2012/0032426 A1 Feb. 9, 2012

(30) Foreign Application Priority Data

Aug. 5, 2010 (JP) ................................ 2010-176435

(51) Int. Cl.
*B60R 21/16* (2006.01)
(52) U.S. Cl.
USPC ...................................................... 280/730.2
(58) Field of Classification Search ................ 280/730.2
See application file for complete search history.

(56) References Cited

U.S. PATENT DOCUMENTS

| 6,338,498 | B1 * | 1/2002 | Niederman et al. | ....... 280/728.2 |
|---|---|---|---|---|
| 6,830,262 | B2 | 12/2004 | Sonnenberg et al. | |
| 7,077,425 | B2 | 7/2006 | Ogawa et al. | |
| 7,828,322 | B2 | 11/2010 | Breuninger et al. | |
| 7,922,193 | B2 * | 4/2011 | Breuninger et al. | ....... 280/730.2 |
| 7,988,187 | B2 * | 8/2011 | Yamamura et al. | ........ 280/730.2 |
| 8,020,888 | B2 * | 9/2011 | Cheal et al. | ................ 280/730.2 |
| 8,186,710 | B2 * | 5/2012 | Cheal et al. | ................ 280/730.2 |
| 2006/0157958 | A1 * | 7/2006 | Heudorfer et al. | ......... 280/730.2 |
| 2010/0032930 | A1 | 2/2010 | Yamamura et al. | |

FOREIGN PATENT DOCUMENTS

| JP | 2003200810 A | 7/2003 |
|---|---|---|
| JP | 2004142530 A | 5/2004 |
| JP | 2006193151 A | 7/2006 |
| JP | 2006298334 A | 11/2006 |
| JP | 2007069721 A | 3/2007 |
| JP | 2008260425 A | 10/2008 |

* cited by examiner

*Primary Examiner* — Faye M. Fleming
(74) *Attorney, Agent, or Firm* — Posz Law Group, PLC

(57) ABSTRACT

A head-protecting airbag apparatus mountable on a vehicle having a window is disclosed. The airbag apparatus includes an airbag adapted to be secured to a member of a vehicle body structure by an upper edge thereof in an upper edge of the window and housed in the upper edge of the window in a folded-up configuration. The airbag includes an inflatable shielding section that covers an inboard side of the window at full airbag deployment, a supporting inflatable region that is in gas communication with the shielding section and deployable between an outboard side of a vicinity of an upper end of the shielding section and the member of the vehicle body structure in an upper area of the window, and delaying means that delays inflation of the supporting inflatable region relative to the shielding section. The supporting inflatable region inflates after the shielding section does between the shielding section and the member of the vehicle body structure, and supports the outboard side of the vicinity of the upper end of the shielding section.

8 Claims, 12 Drawing Sheets

Sectional view taken along line A-A

HEAD-PROTECTING AIRBAG APPARATUS

CROSS REFERENCE TO RELATED APPLICATIONS

The Present application claims priority from Japanese Patent Application No. 2010-176435 of Tanaka et al., filed on Aug. 5, 2010, the disclosure of which is hereby incorporated into the present application by reference.

BACKGROUND OF THE INVENTION

1. Field of the Invention

The present invention relates to a head-protecting airbag apparatus including an airbag that is mountable on an upper periphery of a vehicle window in a folded-up configuration and deployable downward for covering an inboard side of the window when fed with an inflation gas.

2. Description of Related Art

JP2010-36805 discloses a head-protecting airbag apparatus including an airbag that is provided with a shielding section for covering an inboard side of a window in order to hold a vehicle occupant inboard and protect him/her during a rollover event of a vehicle possibly occurring after a side impact. The shielding section includes an extended lower end that can reach up to below a beltline of a vehicle at airbag deployment and the lower end includes either on the inboard side or outboard side a reinforcing inflatable portion that is inflatable in a rod shape extending along a front and rear direction.

That is, the shielding section of this configuration has a wide area due to the lower end reachable up to below the beltline for improving a head restraint performance during a rollover event, and therefore, there is a room for improvement in reducing a volume of the shielding section.

JP2004-142530, JP2006-193151, JP2007-69721, JP2009-286300 and U.S. Pat. No. 6,830,262 disclose head-protecting airbag apparatuses as well. The apparatuses respectively include an airbag provided with an auxiliary inflatable portion on an outboard side of an upper end of its inflatable shielding section.

However, the auxiliary inflatable portions of these known head-protecting airbag apparatuses are provided for assisting the inflatable shielding sections to override a pillar protruding inward more than surrounding windows, and to this end, the auxiliary inflatable portions are designed to inflate prior to the inflatable shielding sections. A rollover event possibly occurring after a side impact is not taken into consideration in these references.

SUMMARY OF THE INVENTION

An object of the present invention is to provide a head-protecting airbag apparatus that does not increase a volume of an airbag and is capable of preventing an ejection of an occupant during a rollover event after a side impact.

The object of the invention will be achieved by a following head-protecting airbag apparatus:

The head-protecting airbag apparatus is mountable on a vehicle having a window and includes an airbag adapted to be housed in an upper edge of the window in a folded-up configuration. The airbag is deployable downward for covering an inboard side of the window when fed with an inflation gas. The airbag includes an inflatable shielding section that is adapted to be secured to a member of a vehicle body structure by an upper edge thereof in the upper edge of the window and covers the window at full airbag deployment, a supporting inflatable region that is in gas communication with the shielding section and deployable between an outboard side of a vicinity of an upper end of the shielding section and the member of the vehicle body structure in at least an upper area of the window, and delaying means that delays inflation of the supporting inflatable region relative to the shielding section. The delaying means makes the supporting inflatable region inflate after the shielding section does and support the outboard side of the vicinity of the upper end of the shielding section.

With the above configuration, upon a side impact event, the shielding section firstly inflates and then the supporting inflatable region inflates between the shielding section and the member of the vehicle body structure. At this time, since the upper edge of the shielding section is secured to the member of the vehicle body structure, the shielding section rotates about the upper edge acting as a fixing point to the member of the vehicle body structure in such a manner as to move the lower end or leading end toward an interior of a vehicle, thereby moving the lower end toward the interior by more than the thickness of the supporting inflatable region. In the meantime, since the supporting inflatable region supports the outboard side of the vicinity of the upper end of the shielding section, the shielding section is enabled to counteract a pressure of a head of an occupant moving in an outboard direction due to a rollover of a vehicle, thereby arresting the head properly. That is, in the head-protecting airbag apparatus of the invention, the inflation of the supporting inflatable region will help secure a great distance between the lower end of the shielding section and the window in an inboard and outboard direction, and therefore, the head-protecting airbag apparatus will be capable of preventing an occupant's head from moving toward an exterior of a vehicle and holding the occupant inside a vehicle during a rollover event possibly occurring after a side impact though the lower edge of the shielding section is located above the beltline of a vehicle.

Although the airbag of the invention includes the shielding section and supporting inflatable region, the volume of the airbag to be inflated upon a side impact event will be limited since the supporting inflatable region is configured to inflate after the shielding section completes inflation, and therefore, only an area of the shielding section required for cushioning an occupant's head has to be inflated before a rollover occurs.

Therefore, the head-protecting airbag apparatus of the invention will not increase a substantial volume of the airbag to be inflated upon a side impact event and is capable of preventing an ejection of an occupant during a rollover event possibly occurring after a side impact.

In the above airbag apparatus, it is desired that the airbag further includes a communication channel that is generally tubular in shape and makes the supporting inflatable region communicate with the shielding section, and that the delaying means is located in an area of the communication channel. This configuration will steadily delay the inflation of the supporting inflatable region relative to the shielding section by controlling opening/closing of the communication channel by the delaying means.

More specifically, it is desired that the airbag in a flattened and developed state before assembling into the airbag apparatus is so configured that the supporting inflatable region adjoins the shielding section having the communication channel interposed there between in the airbag, and the supporting inflatable region is folded over the outboard side of the shielding section on a crease that cuts across the communication channel, such that the a turn-round region that is formed on the communication channel by the folding of the supporting inflatable region over the shielding section constitutes the delaying means. This configuration will be capable of preventing an inflation gas from flowing into the communication channel when the gas flows into the shielding section in an initial stage of airbag inflation, such that the shielding section will be fully inflated and protect an occupant's head in a side impact event. Thereafter, as an inner pressure of the shielding section increases, the gas will reach the turn-round region and separate panels defining the turn-round region away from each other, such that the gas will be allowed to flow into the supporting inflatable region through the communication channel. That is, the head-protecting airbag apparatus of the invention will not require any other delaying means like a seam, thereby simplifying the structure.

In the airbag apparatus described above, it is further desired that the shielding section includes a protection region that is located proximate a lower end of the shielding section at full deployment and a gas feed channel that extends generally along a front and rear direction proximate an upper end of the shielding section at full deployment over a generally entire area in a front and rear direction of the shielding section for feeding an inflation gas to the protection region, and that the communication channel protrudes upward from the upper edge of the shielding section above the gas feed channel in the airbag in a flattened and developed state before assembling into the airbag apparatus.

This configuration will help prevent an inflation gas from flowing into the communication channel in an initial stage of inflation of the shielding section as much as possible since the communication channel is located above the gas feed channel in a flattened state, thereby delaying an initiation of inflation of the supporting inflatable region relative to the shielding section in a steady fashion.

In the airbag apparatus described above, it is desired that the shielding section includes, in an area thereof overlapping with the supporting inflatable region, a communicating area that makes the gas feed channel communicate with the protection region in a vertical direction. With this configuration, the area of the shielding section overlapping with the supporting inflatable region, i.e., the area supported by the supporting inflatable region at full inflation of the supporting inflatable region, will inflate in a single plate shape extending in a vertical direction. That is, the area is not likely to bend in an inboard or outboard direction, thereby stabilizing a moving amount of the lower end of the shielding section toward an interior of a vehicle (or a slanting amount of the shielding section) when the supporting inflatable region supports the shielding section, and assuring an arrest of an occupant.

Moreover, if the above airbag apparatus is provided with means for preventing the supporting inflatable region from slipping upward at airbag deployment, the supporting inflatable region will be steadily positioned between the vicinity of the upper end of the shielding section and the member of the vehicle body structure at airbag deployment.

To this end, it is desired that the supporting inflatable region is so elongate in a front and rear direction as to stride over at least one of mounting portions that are arranged along a front and rear direction on the upper edge of the shielding section for mounting the upper edge of the shielding section on the member of the vehicle body structure. With this configuration, the mounting portion is secured to the member of the vehicle body structure above the supporting inflatable region, and therefore will prevent the supporting inflatable region from slipping upward from the shielding section and/or prevent the supporting inflatable region from being located on an inboard side of the shielding section.

Furthermore, it is desired that the communication channel narrows toward the supporting inflatable region and the turn-round region is located in an intermediate position in a length direction of the communication channel. With this configuration, an inflation gas will pool in a wider area of the communication channel located on the side of the shielding section relative to the turn-round region until the gas flows into the supporting inflatable region, and once an inner pressure rises the gas will separate the panels defining the turn-round region and flow into the supporting inflatable region without delay, in spite of the constricted outlet to the supporting inflatable region. As a result, the timing of inflow of an inflation gas into the supporting inflatable region will be further stabilized.

It will also be appreciated to prepare the supporting inflatable region separate from the shielding section. This configuration will reduce remaining materials which would be formed around the supporting inflatable region due to partial protrusion of the supporting inflatable region and discarded in comparison with an instance where the supporting inflatable region was integral with the shielding section, and therefore, will improve a material yield of the airbag.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
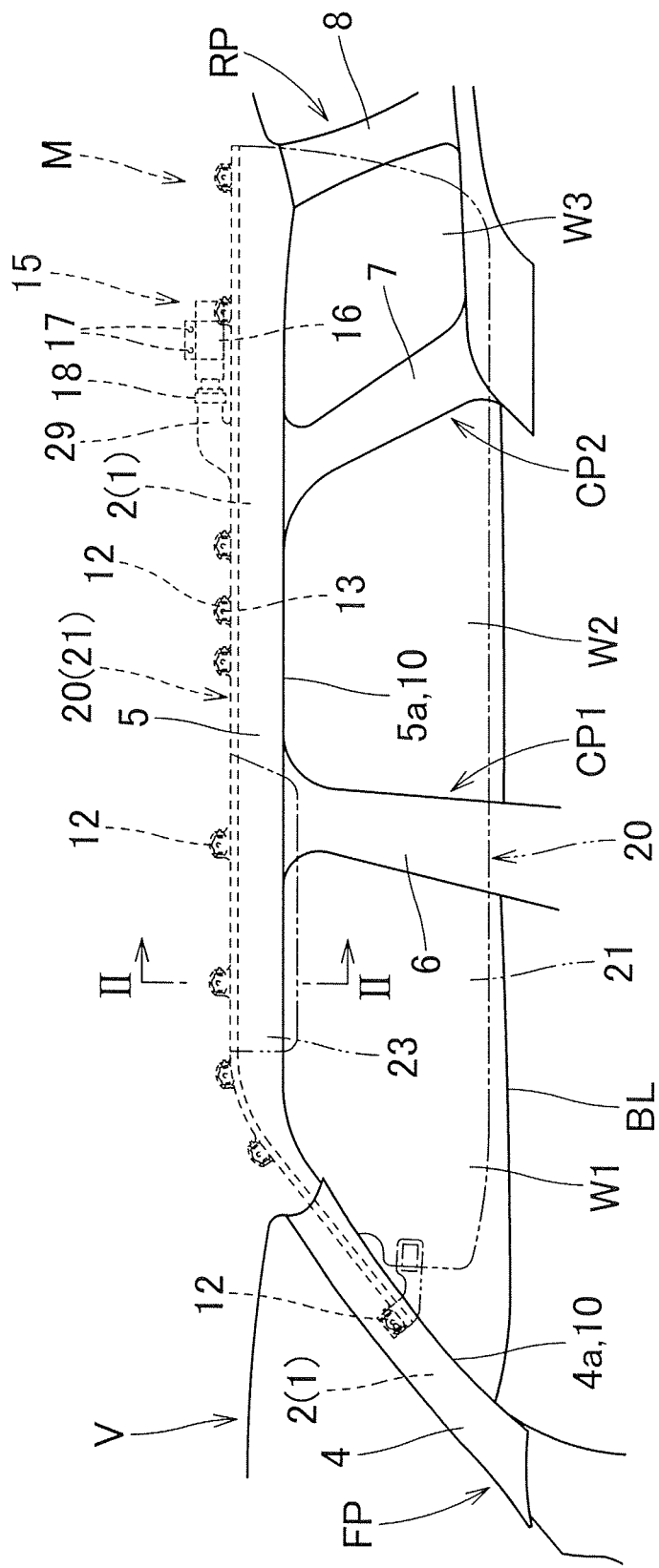
FIG. 1 is a schematic front elevation of a head-protecting airbag apparatus embodying the invention in an on-board state, as viewed from an interior of a vehicle.

As shown in FIG. 1, an airbag apparatus M embodying the present invention is mounted on a vehicle V with three side windows W1, W2 and W3 and corresponding three rows of seats. The airbag apparatus M includes an airbag 20, an inflator 15, a mounting bracket 16, a plurality of mounting brackets 12 and an airbag cover 10. The airbag 20 is housed on upper peripheries of the side windows W1, W2 and W3 in an folded-up configuration, specifically from the lower periphery of a front pillar FP through the region above a rear pillar RP, along the lower periphery of a roof side rail RR, on an inboard side of the vehicle V.

Figure 2:
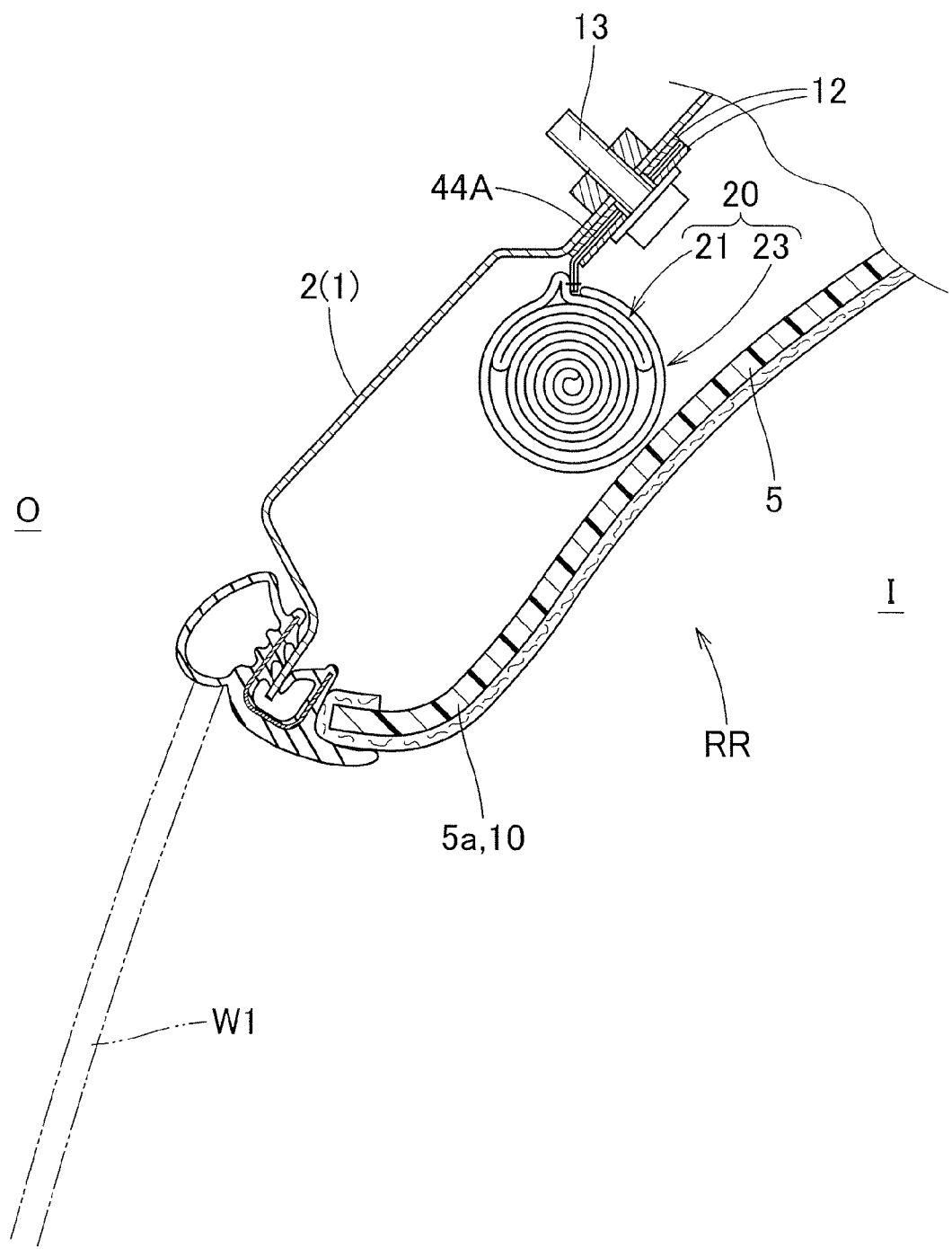
FIG. 2 is a sectional view taken along line II-II of FIG. 1.
Figure 9:
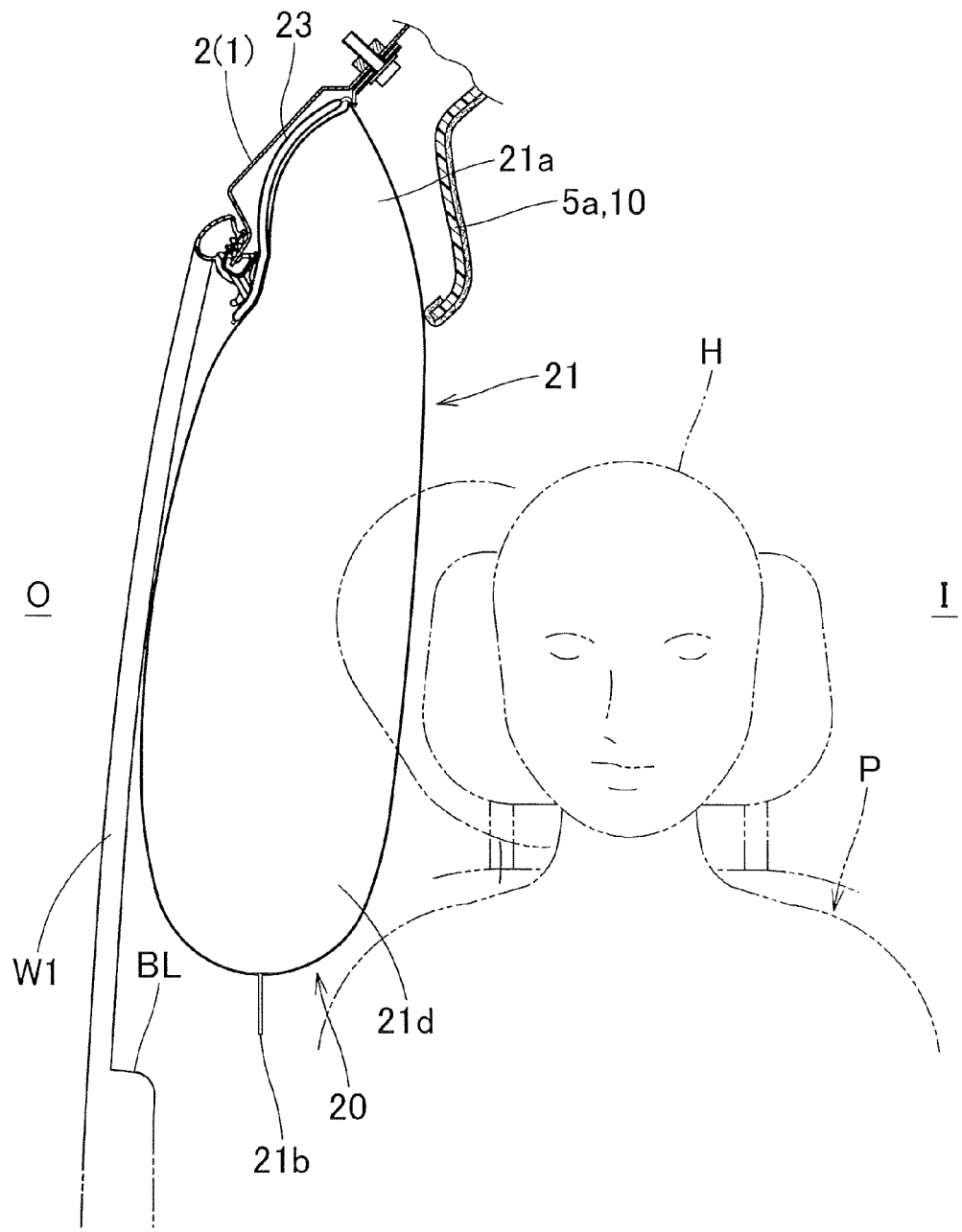
FIG. 9 is a schematic section of the head-protecting airbag apparatus in an on-board state taken along a left and right direction of a vehicle, which shows that the shielding section of the airbag is inflated upon a side impact.
Figure 10:
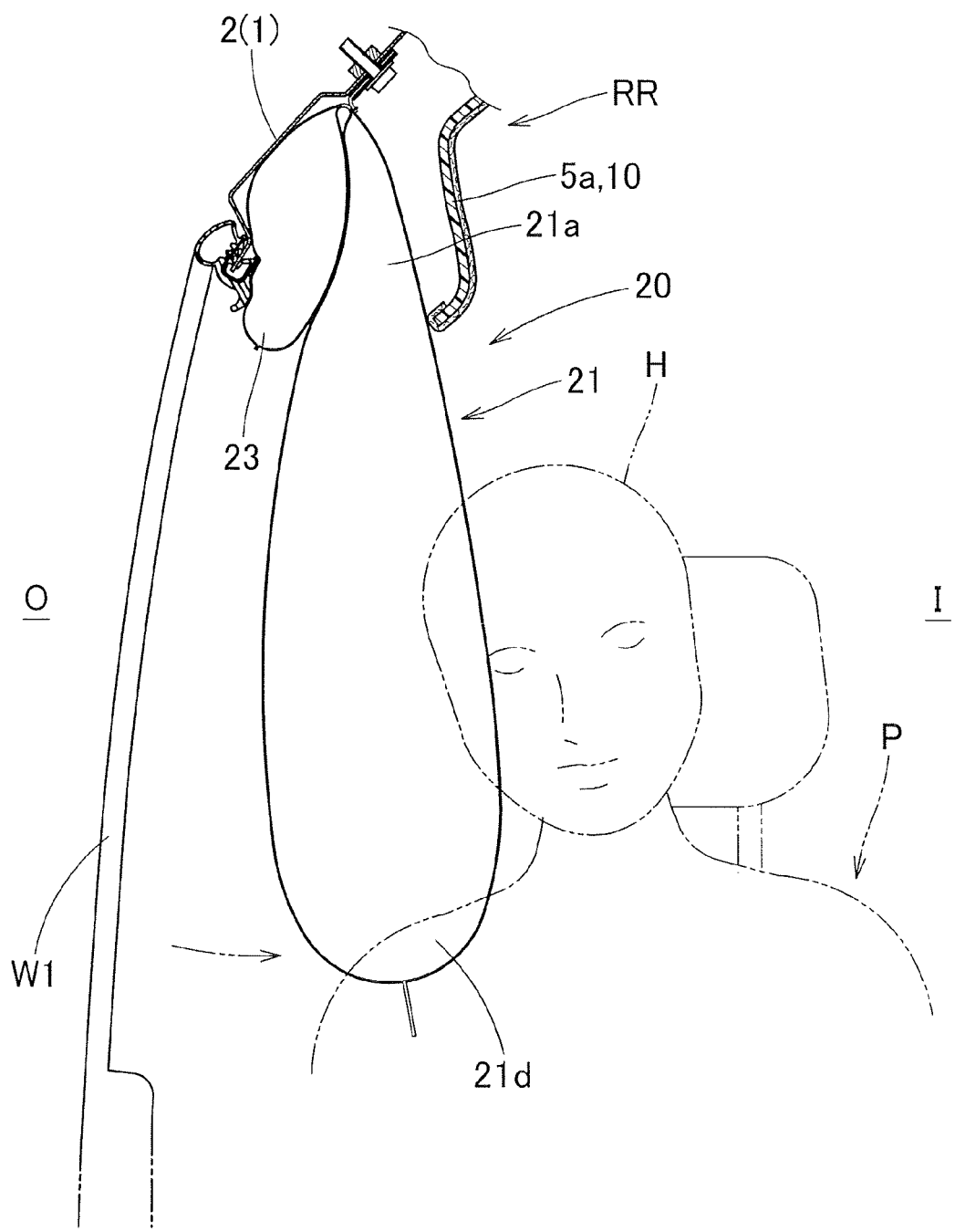
FIG. 10 is a schematic section of the head-protecting airbag apparatus in an on-board state taken along a left and right direction of a vehicle, which shows that the supporting inflatable region is inflated after inflation of the shielding section.

As shown in FIGS. 1 and 2, the airbag cover 10 is comprised of a lower edge region 4a of a front pillar garnish 4 arranged on the front pillar FP and a lower edge region 5a of a roof head liner 5 arranged on the roof side rail RR. The front pillar garnish 4 and roof head liner 5 are made of synthetic resin and are secured to an inboard side of an inner panel 2 which is a member of a vehicle body structure 1. The airbag cover 10 covers an inboard side of the airbag 20 in a housed condition and is designed openable when pushed by the airbag 20 so as to allow the airbag 20 to protrude toward an interior I of the vehicle as shown in FIGS. 9 and 10. In this specific embodiment, a void area formed between the inner panel 2 and airbag cover 10 at the upper peripheries of the windows W1, W2 and W3 acts as a housing of the airbag 20.

As shown in FIG. 1, the inflator 15 has a substantially cylindrical shape and is provided at the leading end with not-shown gas discharge ports for discharging an inflation gas to feed to the airbag 20. The inflator 15 is inserted into and coupled with a later-described gas inlet port 29 of the airbag 20 at the leading end, with a clamp 18 mounted around the rear end 29a of the gas inlet port 29. The inflator 15 is secured to the inner panel 2 at a location above the window W3 by the mounting bracket 16 holding the inflator 15 and bolts 17 fastening the bracket 16 to the inner panel 2. The inflator 15 is electrically connected with a not-shown control via a not-shown lead wire so as to be actuated by an actuating signal fed from the control when a side impact of the vehicle V is detected.

Each of the mounting brackets 12 is comprised of a pair of metal plates to be attached to both sides of one of later-described mounting portions 44 (44A or 44B) in a sandwiching manner. The mounting brackets 12 serve to secure the mounting portions 44 (44A or 44B) to the inner panel 2 together with mounting bolts 13.

Figure 5:
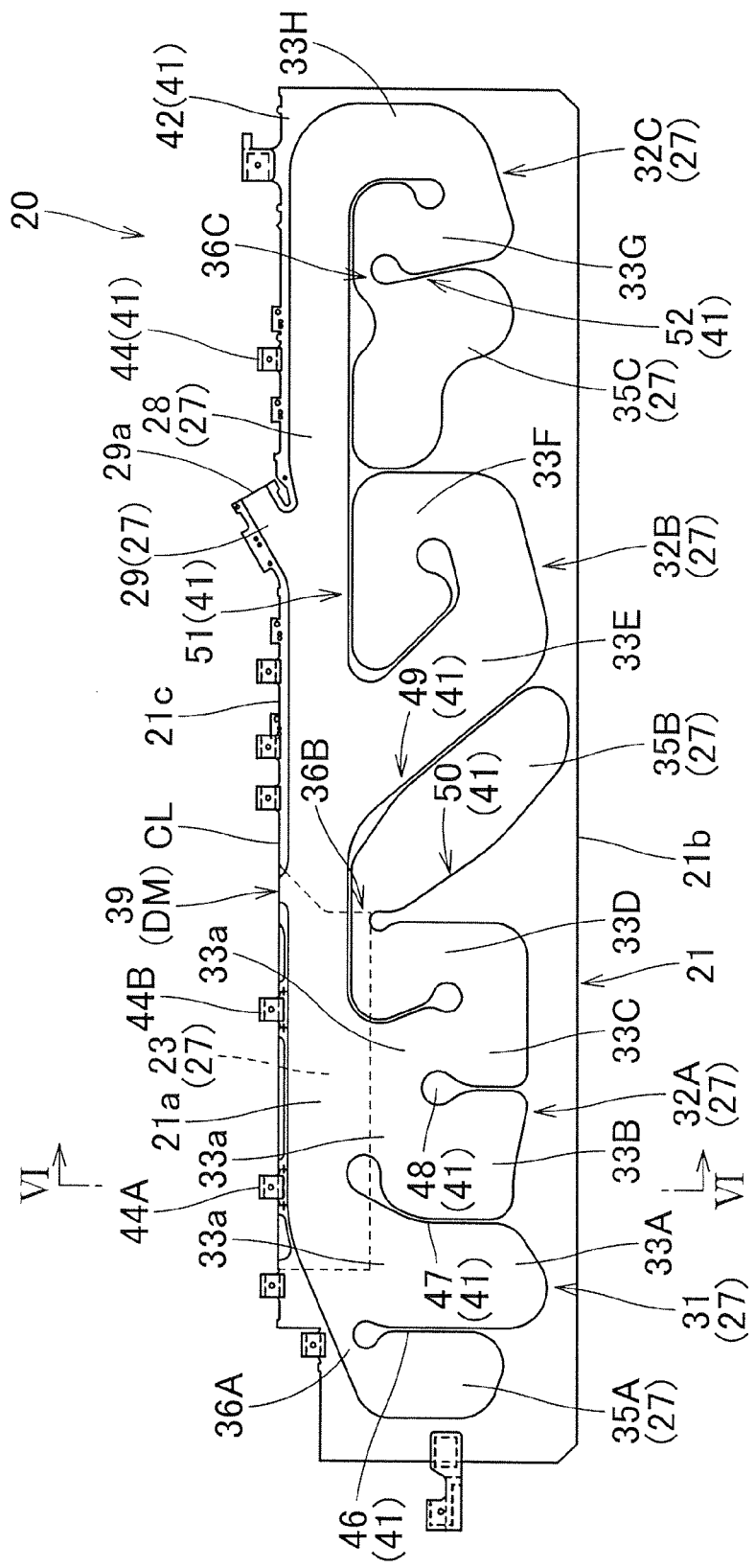
FIG. 5 is a front elevation of the airbag formed by folding the bag module of FIG. 3.
Figure 8:
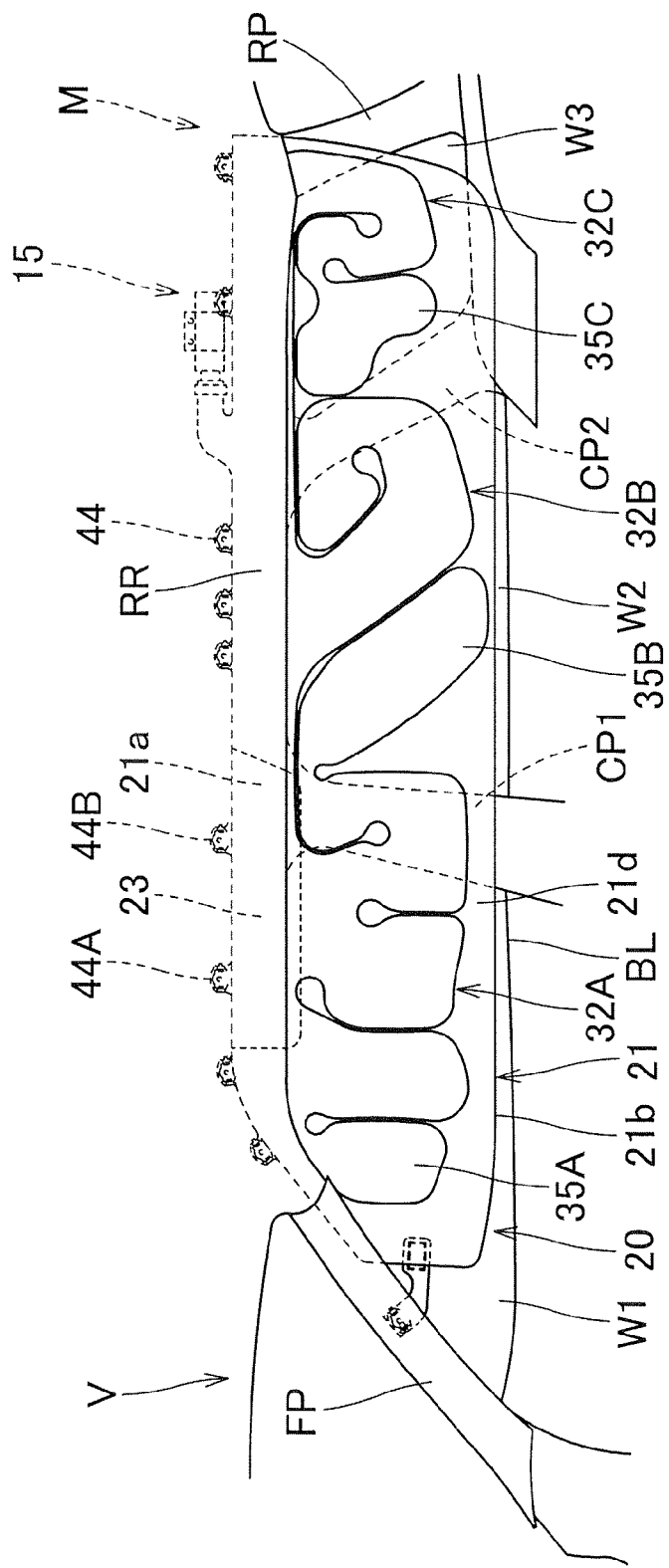
FIG. 8 is a schematic front elevation of the head-protecting airbag apparatus in operation as viewed from an interior of a vehicle.

As shown in FIGS. 1 and 8, the airbag 20 unfolds and deploys when fed with an inflation gas by the inflator 15 and covers an inboard side of the windows W1, W2 and W3, pillar garnishes 6 and 7 arranged on middle pillars CP1 and CP2 located between the windows W1 and W2 or W2 and W3 and a pillar garnish 8 arranged on the rear pillar RP located at the rear of the window W3. Referring to FIGS. 8 to 10, the airbag 20 includes a shielding section 21 that is deployable to cover an inboard side of the windows W1, W2 and W3 and a supporting inflatable region 23 that is deployable at an outboard side of a vicinity of an upper end 21a of the shielding section 21. As shown in FIG. 5, the shielding section 21 is inflatable into a generally rectangular plate shape extending along a front and rear direction so as to cover an area from the window W1 to a region in front of the rear pillar RP, via the middle pillar CP1, window W2, middle pillar CP2 and window W3. As shown in FIGS. 8 and 9, the shielding section 21 at full deployment is so sized in a vertical dimension as to be capable of protecting a head of an occupant seated in any row of seats, but not to reach a beltline BL formed by lower edges of the windows W1, W2 and W3. That is, the lower edge 21b of the shielding section 21 is located above the beltline BL at airbag deployment.

The supporting inflatable region 23 is inflatable generally into a rod shape extending along a front and rear direction and capable of covering an outboard side of the vicinity of the upper end 21a of the shielding section 21 in a range from the window W1 through the middle pillar CP1.

Figure 3:
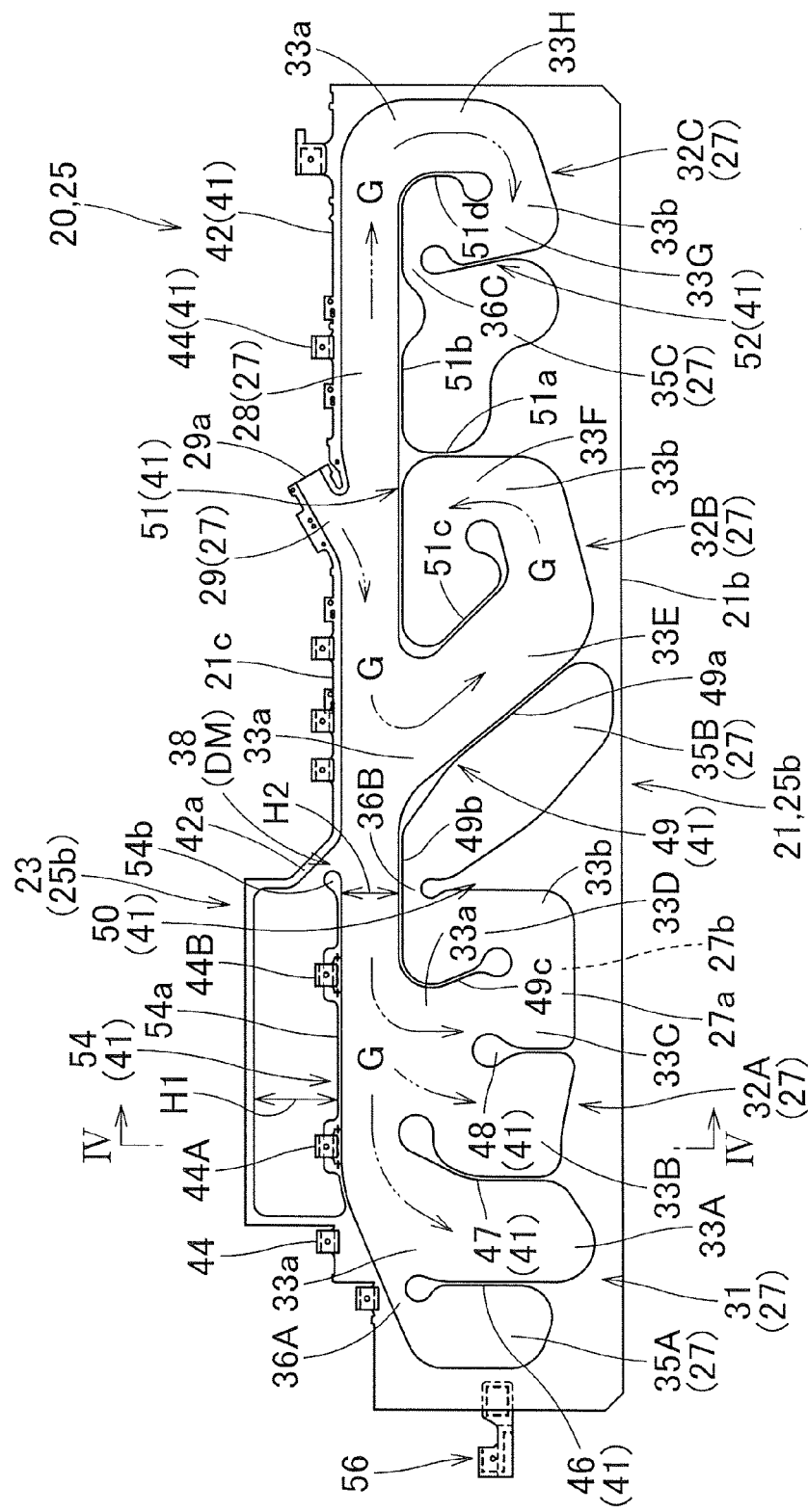
FIG. 3 is a front elevation of a bag module that constitutes an airbag for use in the airbag apparatus of FIG. 1, in a flattened and developed state.
Figure 4:
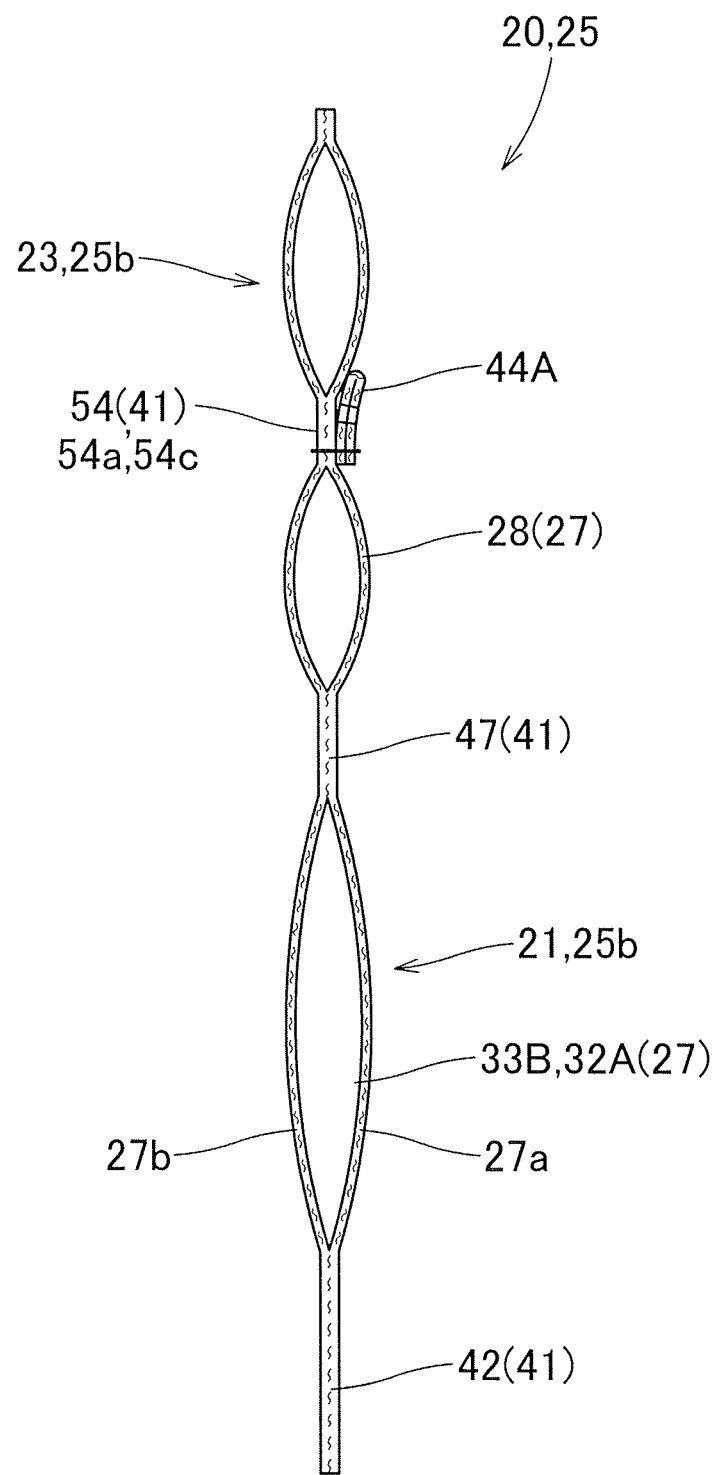
FIG. 4 is a sectional view taken along line IV-IV of FIG. 3.
Figure 6:
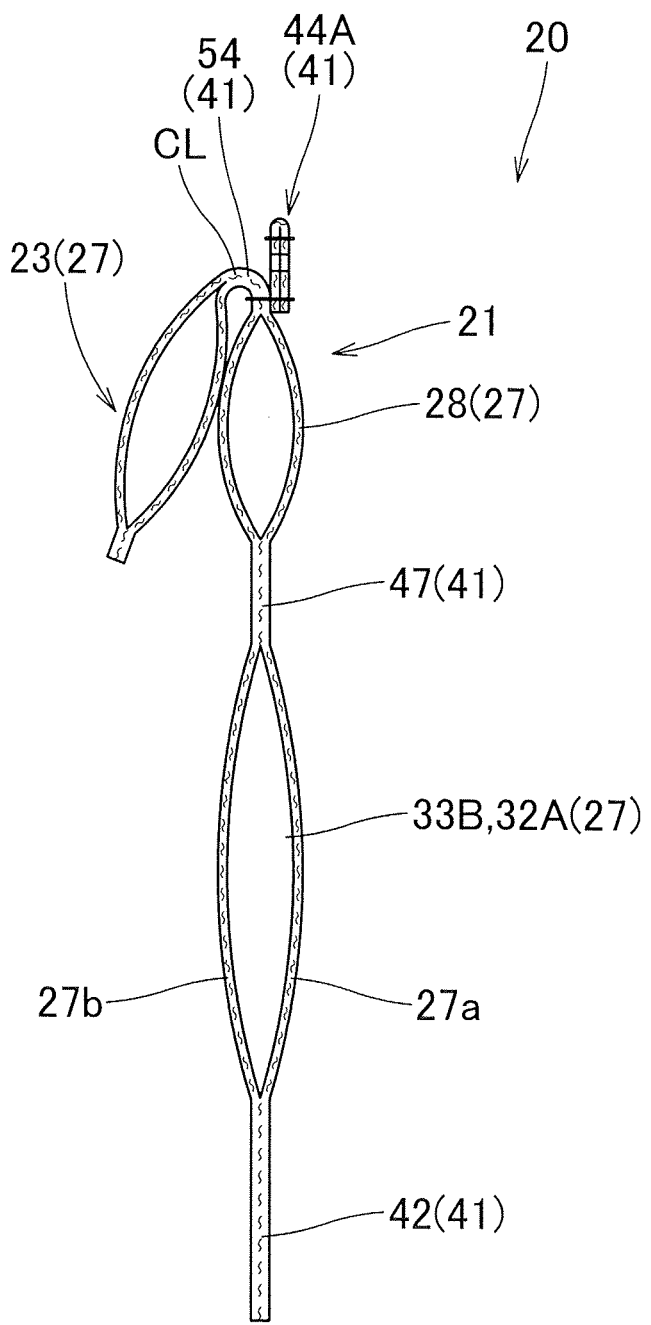
FIG. 6 is a sectional view taken along line VI-VI of FIG. 5.

As shown in FIGS. 3 and 4, the airbag 20 of this specific embodiment is formed of a bag module 25 in which the supporting inflatable region 23 and shielding section 21 adjoin in a vertical direction. When mounted on board, the bag module 25 is doubled up in a vicinity of a boundary between the supporting inflatable region 23 and shielding section 21, as shown in FIGS. 5 and 6. That is, in this embodiment, the supporting inflatable region 23 and shielding section 21 are integrally formed. The bag module 25 in a flattened and developed state is so configured that an upper region 25a constituting the supporting inflatable region 23 protrudes upward from a lower region 25b constituting the shielding section 21. The bag module 25 of this specific embodiment has a hollow-weave or one-piece woven construction of polyamide yarn, polyester yarn or the like.

Referring to FIGS. 3 and 4, the airbag 21 or bag module 25 includes a gas admissive region 27 inflatable with an inflation gas by separating an inner panel 27a deployable on an inboard side and an outer panel 27b deployable on an outboard side, and a non-admissive region 41 that admits no inflation gas.

Referring to FIGS. 3 to 6, the gas admissive region 27 includes a gas feed channel 28, the gas inlet port 29, a protection region 31, the supporting inflatable region 23 and a communication channel 38 that makes the supporting inflatable region 23 communicate with the shielding section 21. The gas feed channel 28, the gas inlet port 29 and the protection region 31 are located in the shielding section 21. As described above, the supporting inflatable region 23 is folded on an outboard side of the shielding section 21 when mounted on board. Accordingly, at airbag deployment, a wall of the supporting inflatable region 23 continuing from the inner panel 27a of the shielding section 21 is deployed on an outboard side whereas the other wall continuing from the outer panel 27b of the shielding section 21 is deployed on an inboard side.

Referring to FIGS. 3 and 5, the gas feed channel 28 extends generally in a front and rear direction along the upper edge 21a of the shielding section 21 for guiding an inflation gas G fed from the inflator 15 toward the protection region 31 located below the gas feed channel 28. The gas feed channel 28 is arranged over all length of the shielding section 21. The gas inlet port 29 of this specific embodiment is located at a position slightly to the rear from the center in a front and rear direction of the gas feed channel 28 for connection with the inflator 15. The gas inlet port 29 is in gas communication with the gas feed channel 28 and protrudes upward and rearward in a slanting manner from the gas feed channel 28. In this embodiment, the gas inlet port 29 is mounted around the inflator 15 at the rear end 29a and coupled with the inflator 15 with the clamp 18.

The protection region 31 includes a plurality of head restraint regions 32A, 32B and 32C and a plurality of auxiliary inflatable regions 35A, 35B and 35C located in front of or at the rear of the head restraint regions 32A, 32B and 32C and inflatable after the head restraint regions 32A, 32B and 32C.

The head restraint regions 32A, 32B and 32C are designed to inflate in the event of a side impact of a vehicle V and protect a head of an occupant. Three head restraint regions 32A, 32B and 32C are provided in this embodiment corresponding to the windows W1, W2 and W3 (i.e., corresponding to the three rows of seats). In this embodiment, each of the head restraint regions 32A, 32B and 32C is comprised of a plurality of vertical cells 33 respectively inflatable into a generally vertical rod. The head restraint region 32A is located at the front for deployment at a side of a front seat or the window W1 for covering the window W1, except a front end area, and the middle pillar CP1. The region 32A includes four vertical cells 33A, 33B, 33C and 33D lining up in a front and rear direction. The vertical cells 33A, 33B and 33C are deployable over the window W1 and respectively communicate with the gas feed channel 28 at the upper ends 33a for letting in an inflation gas G via the upper ends 33a. The vertical cell 33D located at the rearmost is deployable over the middle pillar CP1 and is closed at the upper end by a horizontal region 49b of a later-described partitioning portion 49 whereas in gas communication with the vertical cell 33C at the lower end 33b, thus letting in an inflation gas G from the lower end 33b, via the vertical cell 33C.

The head restraint region 32B is designed deployable at a side of a second-row seat or window W2 for covering a rear area of the window W2 and the middle pillar CP2. The region 32B includes two vertical cells 33E and 33F lining up in a front and rear direction. The vertical cells 33E and 33F are arranged in such a manner as to slant rearward and downward relative to a front and rear direction. The vertical cell 33E located on a front side is deployable over the window W2 and communicates with the gas feed channel 28 at the upper end 33a for letting in an inflation gas G via the upper end 33a. The vertical cell 33F located on a rear side is closed at the upper end by a horizontal region 51b of a later-described partitioning portion 51 whereas communicated with the vertical cell 33E at the lower end 33b, thus letting in an inflation gas G from the lower end 33b, via the vertical cell 33E. In this specific embodiment, the vertical cell 33F has a generally trapezoidal shape with a wider upper side in a flattened and noninflated state.

The head restraint region 32C is designed deployable at a side of a third-row seat or window W3 for covering a rear area of the window W3 and the rear pillar RP. The region 32C includes two vertical cells 33G and 33H lining up in a front and rear direction. The vertical cell 33H located on a rear side communicates with the gas feed channel 28 at the upper end 33a for letting in an inflation gas G via the upper end 33a. The vertical cell 33G located on a front side is closed at the upper end by the horizontal region 51b of the partitioning portion 51 whereas communicated with the vertical cell 33H at the lower end 33b, thus letting in an inflation gas G from the lower end 33b, via the vertical cell 33H.

The auxiliary inflatable regions (or auxiliary regions, as will be called herein after) 35A, 35B and 35C are respectively located in front of the head restraint region 32A, between the head restraint regions 32A and 32B, and between the head restraint regions 32B and 32C. More specifically, the auxiliary inflatable region 35A is deployable in front of the head restraint region 32A adjoining the vertical cell 33A of the head restraint region 32A. The auxiliary region 35A is inflatable into such a shape as to extend in a vertical direction along the vertical cell 33A. The auxiliary region 35A is designed to admit an inflation gas from above via a conduit 36A located proximate the upper end for communication with the gas feed channel 28. The auxiliary inflatable region 35B is so located as to fill a void region between the head restraint regions 32A and 32B, adjoining the vertical cell 33E of the head restraint region 32B. The auxiliary region 35B is inflatable into such a shape as to extend rearward and downward in a slanting manner along the vertical cell 33E. The auxiliary region 35B is designed to admit an inflation gas from above via a conduit 36B located proximate the upper end for communication with the vertical cell 33D of the head restraint region 32A. The auxiliary inflatable region 35C is so located as to fill a void region between the head restraint regions 32B and 32C. The auxiliary region 35C is inflatable into an oblong shape arranged to extend rearward and downward in a slanting manner relative to a front and rear direction. The auxiliary region 35C is designed to admit an inflation gas from the rear upper region via a conduit 36C located proximate the rear upper end for communication with the vertical cell 33G of the head restraint region 32C.

The auxiliary inflatable regions 35A, 35B and 35C are provided to prevent an ejection of an occupant in a rollover event possibly occurring after a side impact, and designed to start to inflate after the head restraint regions 32A, 32B and 32C do. More specifically, reduced opening widths (or opening areas) of the conduits 36A, 36B and 36C make the auxiliary regions 35A, 35B and 35C start admitting an inflation gas G later than the head restraint regions 32A, 32B and 32C do. Specifically, the opening width (opening area or inside diameter) of each of the conduits 36A, 36B and 36C is so determined that each of the auxiliary regions 35A, 35B and 35C does not start admitting inflation gas until 20 ms after detection of a side impact and admit inflation gas in a time interval of 30 ms to 100 ms after detection of a side impact whilst each of the head restraint regions 32A, 32B and 32C completes inflation in about 20 ms after detection of a side impact.

In a flattened and developed state of the bag module 25, the supporting inflatable region 23 extends in a front and rear direction along the gas feed channel 28 above the head restraint region 32A. More specifically, the supporting inflatable region 23 is arranged in an area above the head restraint region 32A ranging from a rear half of the vertical cell 33A to the vertical cell 33D. As shown in FIG. 3, in a flattened state, a dimension H1 of the supporting inflatable region 23 in a vertical direction is slightly greater than a dimension H2 of the gas feed channel 28 in a vertical direction. Specifically, the dimension H1 is so determined that the lower end region of the supporting inflatable region 23 protrudes from the roof side rail RR at airbag deployment, as shown in FIGS. 8 and 10. In this embodiment, the communication port 38 that makes the supporting inflatable region 23 communicated with the shielding section 21 (or gas feed channel 28) is located at the rear lower end in a flattened and developed state (or at the rear upper end in an on-board state) of the supporting inflatable region 23, and the supporting inflatable region 23 is partitioned from the shielding section 21 by a later-described partitioning portion 54 except in an area where the communication port 38 is located. The supporting inflatable region 23 includes delaying means DM that delays admission of inflation gas G and therefore postpones its inflation relative to the shielding section 21 (i.e., the gas feed channel 28 and head restraint regions 32A, 32B and 32C), as will be described in detail below. Similarly to the auxiliary regions 35A, 35B and 35C, the supporting inflatable region 23 is designed to admit inflation gas and inflate in a time interval of 30 ms to 100 ms after detection of a side impact when the head restraint regions 32A, 32B and 32C complete inflation and have increased inner pressures.

Referring to FIGS. 3 and 5, the non-admissive region 41 includes a peripheral region 42 that defines a peripheral edge of the bag module 25, mounting portions 44 that serve for mounting the airbag 20 on the inner panel 2, partitioning portions 46, 47, 48, 49, 50, 51 and 52 each located in the protection region 31, and a partitioning portion 54 that partitions the supporting inflatable region 23 and shielding section 21 (or gas feed channel 28, specifically).

The peripheral region 42 is so formed as to encircle the gas admissive region 27 entirely except at the rear end 29a of the gas inlet port 29. As best shown in FIG. 3, the peripheral region 42 includes a sloping region 42a that slopes downward and rearward in a vicinity of the rear lower end of the supporting inflatable region 23 in a flattened and developed state (or in a vicinity of the rear upper end in an on-board state). The mounting portions 44 are formed in plurality along a front and rear direction in such a manner as to project upward from the upper edge 21c of the shielding section 21 for mounting the upper edge 21 c on the inner panel 2. The airbag 20 of the illustrated embodiment includes nine such mounting portions 44. Each of the mounting portions 44 is provided with an aperture (reference numeral omitted) for receiving the above-described mounting bolt 13. As shown in FIGS. 4 and 6, each of the mounting portions 44 in this specific embodiment has a twofold construction for assuring strength. The mounting portions 44 are integral with the peripheral region 42 at locations out of the supporting inflatable region 23 whilst those located in an area of the supporting inflatable region 23, or mounting portions 44A and 44B as will be called herein after, are prepared separate from the bag module 25 and made of an woven fabric of polyamide, polyester or the like, and sewn to later-described general regions 54a of the partitioning portion 54. More specifically, the mounting portions 44A and 44B are sewn to the general regions 54a with sewing threads at such a position in a vertical direction as to generally conform to an edge of the peripheral region 42 located rearward thereof such that the portions 44A and 44B generally accord to other mounting portions 44 in position (specifically, in protruding position from the shielding section 21). In the airbag 20 of the embodiment, the supporting inflatable region 23 is so formed as to stride over the mounting portions 44A and 44B. The mounting portions 44A and 44B act as means for preventing the supporting inflatable region 23 from slipping upward at airbag deployment (as will be referred to as "slippage prevention means") as will be described later.

Referring to FIG. 3, the partitioning portion 46 is formed generally into a rod shape extending vertically from a lower part of the peripheral region 42 and partitions the auxiliary region 35A from head restraint region 32A (or vertical cell 33A). Each of the partitioning portions 47 and 48 is formed generally into a rod shape extending vertically from the lower part of the peripheral region 42 and partitions the vertical cell 33A from cell 33B/vertical cell 33B from cell 33C in the head restraint region 32A. In this specific embodiment, the partitioning portion 48 located between the vertical cells 33B and 33C is smaller in upward protruding amount (or in height) than the partitioning portion 47 located between the vertical cells 33A and 33B. The partitioning portion 49 includes a root side region 49a that extends forward and upward in a slanting manner from the lower part of the peripheral region 42, a horizontal region 49b that extends generally in a front and rear direction (i.e., forward) from the leading end or upper end of the root side region 49a and a distal end region 49c that extends rearward and downward in a slanting manner from the leading end or front end of the horizontal region 49b. The root side region 49a partitions the auxiliary region 35B from head restraint region 32B (or vertical cell 33E). The horizontal region 49b partitions the gas feed channel 28 from the protection region 31 and closes upper ends of the vertical cell 33D and auxiliary region 35B. The distal end region 49c partitions the vertical cell 33C from cell 33D. The partitioning portion 50 is a generally triangular area extending upward from the lower part of the peripheral region 42 and located between the root side region 49a and distal end region 49c of the partitioning region 49 below the horizontal region 49b. The partitioning portion 50 partitions the head restraint region 32A (or vertical cell 33D) from the auxiliary region 35B.

The partitioning portion 51 is located at the rear of the partitioning portion 49 and includes a vertical region 51a extending vertically, a horizontal region 51b extending generally along a front and rear direction from the upper end of the vertical region 51a, a front region 51c extending downward and rearward in a slanting manner from the front end of the horizontal region 51b and a rear region 51d extending downward from the rear end of the horizontal region 51b. The vertical region 51a extends from the lower part of the peripheral region 42 and partitions the head restraint region 32B (vertical cell 33F) from the auxiliary region 35C. The horizontal region 51b partitions the gas feed channel 28 from the protection region 31 and closes upper ends of the vertical cells 33F, 33G and auxiliary region 35C. The front region 51c partitions the vertical cell 33E from cell 33F whilst the rear region 51d partitions the vertical cell 33G from cell 33H. The partitioning portion 52 is formed generally into a rod shape extending vertically from the lower part of the peripheral region 42 below the horizontal region 51b of the partitioning portion 51 and between the vertical region 51a and rear region 51d. The partitioning portion 52 partitions the auxiliary region 35C from the head restraint region 32C (vertical cell 33G).

Each of the partitioning portions 46, 47, 48, 49, 50, 51 and 52 is so formed as to enlarge toward the terminal and form a generally circular shape in order not to induce a stress concentration at airbag deployment. Gaps formed between the partitioning portion 46 and peripheral region 42, between the partitioning portion 50 and horizontal region 49b of the partitioning portion 49, and between the partitioning portion 52 and horizontal region 51b of the partitioning portion 51 respectively act as communication channels 36A, 36B and 36C that let an inflation gas flow into the auxiliary inflatable regions 35A, 35B and 35C. Each of these gaps has a small opening width so as to delay an initiation of inflow of inflation gas into the auxiliary inflatable region 35A/35B/35C as described above. The opening widths of the communication channels 36A, 36B and 36C are generally identical.

Figure 7:
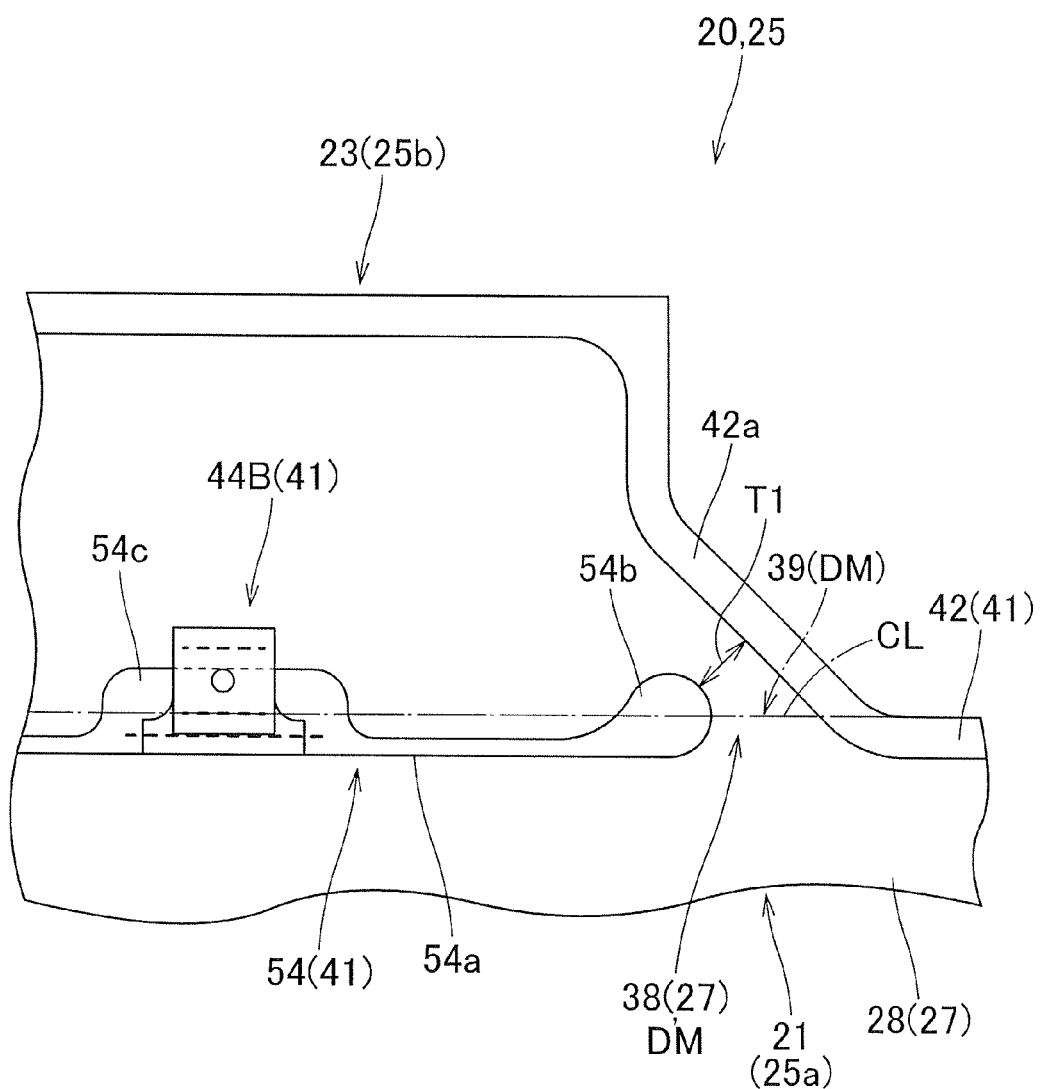
FIG. 7 is a partial enlarged front elevation of a vicinity of a communication area that connects a supporting inflatable region and a shielding section in the bag module of FIG. 3.

The partitioning portion 54 that partitions the supporting inflatable region 23 from the shielding section 21 (gas feed channel 28) is formed generally into a rod shape extending along a front and rear direction (i.e., rearward) from a front end part of the peripheral region 42. As shown in FIG. 3, the partitioning portion 54 includes a general region 54a extending generally in a rod shape along a front and rear direction and a terminal 54b that gradually enlarges and forms a semi-circular shape at the leading end (rear end) of the general region 54a. In other words, the terminal 54b is formed into a shape like a rain drop having a tip on the front side. The general region 54a is provided at two locations in a front and rear direction with wide regions 54c that are formed by partially making widths in a vertical direction wide for the mounting portions 44A and 44B to be sewn thereto. Each of the wide regions 54c protrudes upward from the general region 54a. More specifically, each of the wide regions 54c protrudes upward relative to the edge of the peripheral region 42 located rearward, and the mounting portions 44A and 44B are sewn to the wide regions 54c generally at the same height as the edge of the peripheral region 42. As shown in FIG. 7, the terminal 54b of the illustrated embodiment is so formed as not to protrude downward relative to the general region 54a but protrude upward in such a manner that its lower edge is continuous with that of the general region 54a. Specifically, the terminal 54b is so formed that its axis rises upward and rearward relative to a front and rear direction, and that a gap is formed between itself and the sloping region 42a of the peripheral region 42. In the airbag 20, this gap forms a communication channel 38 that makes the supporting inflatable region 23 communicate with the shielding section 21 or gas feed channel 28. That is, as shown in FIGS. 3 and 7, in a flattened and developed state of the bag module 25, the communication channel 38 is so formed as to protrude upward from the upper edge 21c of the shielding section 21 above the gas feed channel 28.

Further, the communication channel 38 in the illustrated embodiment narrows, in opening width or in inside diameter, toward the supporting inflatable region 23 since the sloping region 42a of the peripheral region 42 slopes downward and rearward whilst the terminal 54b of the partitioning portion 54 is formed into a shape like a rain drop that has the tip end in the front side and has the axis rising rearward and upward.

As described above, when mounted on board, the supporting inflatable region 23 is folded over the outboard side of the shielding section 21 on a crease CL (refer to FIGS. 5 to 7) that extends in a front and rear direction (i.e., forward) from the edge of the peripheral region 42 which is located rearward and defines an upper boundary of the gas feed channel 28. As shown in FIG. 7, the crease CL generally conforms to the edge of the peripheral region 42 located at the rear of the supporting inflatable region 23. More specifically, the crease CL cuts across the terminal 54b of the partitioning portion 54, and is located slightly above the general region 54a. In the airbag 20 of the embodiment, as referred to FIGS. 5 and 7, a turn-round region 39, which is formed on the communication channel 38 along the crease CL when folding the supporting inflatable region 23, constitutes the delaying means DM described above that postpones the inflation of the supporting inflatable region 23 relative to the shielding section 21. The turn-round region 39 or the crease CL cuts across the terminal 54b which is wider in a vertical direction than the general region 54a and is located at a generally intermediate position in a vertical direction of the communication channel 38 between the supporting inflatable region 23 and shielding section 21. More specifically, as shown in FIG. 7, the turn-round region 39 or crease CL is located below the region of the communication channel 38 with the narrowest opening width (inside diameter). In other words, the turn-round region 39 is located on a side of the shielding section 21 relative to the narrowest region of the communication channel 38.

Moreover, the opening width of the narrowest region of the communication channel 38 acting as an exit to the supporting inflatable region 23 constitutes the delaying means DM as well. That is, in the airbag 20, the supporting inflatable region 23 is configured to delay admission of an inflation gas G relative to the shielding section 21 (or the head restraint regions 32A, 32B and 32C of the protection region 31) by bending the communication channel 38 on the crease CL and form the turn-round region 39 so as to occlude the communication channel 38 in addition to making an opening width (or opening area, as shown in FIG. 7) T1 of the narrowest region of the communication channel 38 small. More specifically, in the same way as the auxiliary inflatable regions 35A, 35B and 35C of the protection region 31, the opening width or opening area T1 of the communication channel 38 is so determined that the supporting inflatable region 23 does not start admitting inflation gas until 20 ms after detection of a side impact and start admitting inflation gas in a time interval of 30 ms to 100 ms after detection of a side impact, when the shielding section 21 is increased in inner pressure after each of the head restraint regions 32A, 32B and 32C completes inflation in about 20 ms after detection of a side impact. The supporting inflatable region 23 starts admitting an inflation gas generally simultaneously with the auxiliary inflatable regions 35A, 35B and 35C, or later than the auxiliary inflatable regions 35A, 35B and 35C.

Referring to FIGS. 3 and 5, the airbag 20 further includes a connecting belt 56 in the front of the shielding section 21. The connecting belt 56 is prepared separate from the bag module 25 and made of a woven fabric of polyamide, polyester or the like, like the bag module 25. The connecting belt 56 is sewn to the front end of the center in a vertical direction of the shielding section 21 by its root end region, in such a manner as to protrude forward. The connecting belt 56 includes at a leading end region an aperture (reference numeral omitted) for receiving a mounting bolt 13, and is to be secured to the inner panel 2 with the mounting bracket 12 and mounting bolt 13, in the same manner as the mounting portions 44.

Mounting of the airbag apparatus M on a vehicle V is now described. The bag module 25 is firstly provided with the mounting portions 44A, 44B and connecting belt 56 sewn thereto. This bag module 25 is then folded up from a flattened state. Specifically, the gas feed channel 28 is folded in a bellows fashion on a number of creases extending in a front and rear direction whereas the protection region 31 below the gas feed channel 28 is rolled toward an outboard side from the lower edge 21b. Subsequently, the supporting inflatable region 23 is folded over an outboard side of the shielding section 21 on the crease CL, thereby forming the turn-round region 39 on the communication channel 38 and completing the folding of the airbag 20 as shown in FIG. 2. Then the airbag 20 is wrapped up at predetermined locations by a tearable wrapping member (not shown in the drawings) for keeping the folded-up configuration. The mounting brackets 12 are attached to the mounting portions 44, 44A and 44B and to the leading end of the connecting belt 56, while the inflator 15 is joined to the gas inlet port 29 with the clamp 18. If the mounting bracket 16 is mounted around the inflator 15, an airbag assembly is completed.

Thereafter, the mounting brackets 12 and mounting bracket 16 are located and fastened on predetermined locations on the inner panel 2 of the vehicle body structure 1 with the mounting bolts 13 and 17, and the lead wire extending from the control for actuating the inflator is connected to the inflator 15. If then the front pillar garnish 4 and the roof head liner 5 serving as the airbag cover 10, and the pillar garnishes 6, 7 and 8 are attached to the inner panel 2, the head-protecting airbag apparatus M is mounted on the vehicle V.

When the inflator 15 is actuated in a side impact event after the airbag apparatus M is mounted on the vehicle V, an inflation gas G is discharged from the inflator 15 and flows into the shielding section 21 of the airbag 20. The shielding section 21 inflates and tears the wrapping member, and pushes and opens the airbag cover 10 constructed of the lower edge regions 4a and 5a of the front pillar garnish 4 and roof head liner 5. Thus the airbag 20 deploys downward and covers an inboard side of the windows W1, W2 and W3, the middle pillars CP1, CP2 and the rear pillar RP as shown in FIG. 1 (double-dashed lines) and FIG. 8.

At this time, in the airbag 20 of the head-protecting airbag apparatus M described above, the gas feed channel 28 and the head restraint regions 32A, 32B and 32C of the shielding section 21 firstly complete inflation and then the auxiliary inflatable regions 35A, 35B and 35C 23 of the protection region 31 and the supporting inflatable region let in an inflation gas G and inflate.

In the head-protecting airbag apparatus M described above, the airbag 20 includes the delaying means DM that delays inflation of the supporting inflatable region 23 deployable on an outboard side of the vicinity of the upper end 21a of the shielding section 21 relative to the shielding section 21. Accordingly, in a side impact event, after the shielding section 21 (i.e., the gas feed channel 28 and head restraint regions 32A, 32B and 32C) inflates firstly as shown in FIG. 9, the supporting inflatable region 23 inflates between the shielding section 21 and the inner panel 2 acting as a member of the vehicle body structure as shown in FIG. 10, such that the supporting inflatable region 23 moves the shielding section 21 toward an interior I by its thickness. At this time, since the upper edge 21c of the shielding section 21 is secured to the inner panel 2 of the vehicle body structure, the shielding section 21 will rotate about the mounting portions 44 located on the upper edge 21c and acting as a fixing point to the inner panel 2 in such a manner as to move the lower end or leading end 21d toward the interior I, thereby moving the lower end 21d toward the interior I by more than the thickness of the supporting inflatable region 23. In the meantime, since the supporting inflatable region 23 supports the outboard side of the vicinity of the upper end 21a of the shielding section 21, the shielding section 21 will be enabled to counteract the pressure of a head H of an occupant P moving in an outboard direction due to a rollover of a vehicle, thereby arresting the head H properly. That is, the head-protecting airbag apparatus M will help secure a great distance between the lower end 21d of the shielding section 21 and the window W1 in an inboard and outboard direction upon inflation of the supporting inflatable region 23, and therefore, the head-protecting airbag apparatus M will be capable of preventing an occupant's head H from moving toward an exterior O of a vehicle (as indicated by double-dashed lines in FIG. 10) and holding the occupant P inside a vehicle during a rollover event possibly occurring after a side impact though the lower edge 21b is located above the beltline BL of a vehicle.

Although the airbag 20 includes the shielding section 21 and supporting inflatable region 23, the volume of the airbag 20 to be inflated upon a side impact event will be limited since the supporting inflatable region 23 is configured to inflate after the shielding section 21 completes inflation, and therefore, only an area of the shielding section 21 required for cushioning an occupant's head has to be inflated before a rollover occurs. Here, although the shielding section 21 of the embodiment includes the gas feed channel 28, the head restraint regions 32A, 32B and 32C and the auxiliary inflatable regions 35A, 35B and 35C which are in gas communication with the gas feed channel 28 and the head restraint regions 32A, 32B and 32C, the auxiliary inflatable regions 35A, 35B and 35C are configured to inflate after the gas feed channel 28 and the head restraint regions 32A, 32B and 32C complete inflation in the same manner as the supporting inflatable region 23 because the auxiliary inflatable regions 35A, 35B and 35C are provided for preventing an ejection of an occupant during a rollover event. Accordingly, although an inflatable area of the airbag 20 is extensive, the inflator 15 has only to be of an output sufficient for inflating the gas feed channel 28 and head restraint regions 32A, 32B and 32C. That is, the head-protecting airbag apparatus M will not require an inflator of a large output.

Therefore, the head-protecting airbag apparatus M will not increase the substantial volume of the airbag 20 to be inflated upon a side impact event and is capable of preventing an ejection of an occupant P during a rollover event possibly occurring after a side impact.

In the head-protecting airbag apparatus M, there is provided the communication channel 38 that is generally tubular in shape and makes the supporting inflatable region 23 communicate with the shielding section 21, and the delaying means DM is located in the area of the communication channel 38. With this configuration, inflation of the supporting inflatable region 23 can be delayed in a steady fashion relative to the shielding section 21 by controlling opening/closing of the communication channel 38 by the delaying means DM. If such an advantageous effect does not have to be considered, it will also be appreciated to make the supporting inflatable region communicate with the shielding section via an opening formed on a panel of the shielding section, and provide such delaying means that temporarily closes off the opening.

In the foregoing embodiment, specifically, in the airbag 20 in a flattened and developed state before assembling into the airbag apparatus M, the supporting inflatable region 23 adjoins the shielding section 21 having the communication channel 38 interposed there between and the supporting inflatable region 23 is folded over the outboard side of the shielding section 21 on a crease CL that cuts across the communication channel 38, thus the delaying means DM is comprised of the turn-round region 39 that is formed on the communication channel 38 by the folding of the supporting inflatable region 23 over the shielding section 21. This configuration will restrain an inflow of an inflation gas into the communication channel 38 when the gas flows into the shielding section 21 in an initial stage of airbag inflation, such that the shielding section 21 will be fully inflated and protect an occupant's head H in a side impact event. Thereafter, as an inner pressure of the shielding section 21 increases, the gas will reach the turn-round region 39 and separate the panels (inner panel 27a and outer panel 27b) defining the turn-round region 39 away from each other, such that the gas will be allowed to flow into the supporting inflatable region 23 through the communication channel 38. That is, the head-protecting airbag apparatus M will not require any other delaying means like a seam, thereby simplifying the structure. If such an advantageous effect does not have to be considered, the delaying means may be comprised of such a seam that is formed of tearable threads to close the communication channel such that the communication channel may be openable when an inner pressure of the shielding section increases and the seam is torn.

In the foregoing embodiment, moreover, in the airbag 20 (or bag module 25) in a flattened and developed state before assembling into the airbag apparatus M, the communication channel 38 is so formed as to protrude upward from the upper edge 21c of the shielding section 21 above the gas feed channel 28. This configuration will help prevent an inflation gas from flowing into the communication channel 38 in an initial stage of inflation of the shielding section 21 as much as possible since the communication channel 38 is located above the gas feed channel 28 in a flattened state, thereby delaying an initiation of inflation of the supporting inflatable region 23 relative to the shielding section in a steady fashion. Without considering such an advantageous effect, the communication channel to the supporting inflatable region may be formed to extend in a front and rear direction from a front or rear end of the gas feed channel.

Further, in the foregoing embodiment, the vertical cells 33A, 33B and 33C of the head restraint region 32A which overlaps with the supporting inflatable region 23 communicate with the gas feed channel 28 at the upper ends 33a. In other words, the shielding section 21 includes a communicating area that makes the gas feed channel 28 communicate with the protection region 31 in a vertical direction in its area overlapping with the supporting inflatable region 23. With this configuration, the area of the shielding section 21 overlapping with the supporting inflatable region 23, i.e., the area supported by the supporting inflatable region 23 at full inflation of the supporting inflatable region 23, will inflate in a single plate shape extending in a vertical direction. That is, the area is not likely to bend in an inboard or outboard direction, thereby stabilizing a moving amount of the lower end 21d of the shielding section 21 toward an interior I (or a slanting amount of the shielding section 21) when the supporting inflatable region 23 supports the shielding section 21, and assuring an arrest of an occupant P. Especially in the foregoing embodiment, although the head restraint region 32A to be supported by the supporting inflatable region 23 is divided into more than one vertical cells 33A, 33B, 33C and 33D by the partitioning portions 47, 48 and 49, the vertical cells 33A, 33B and 33C are communicated with the gas feed channel 28 at the upper ends 33a. In other words, the head restraint region 32A has more than one inlet ports for admitting an inflation gas disposed over an entire area in a front and rear direction.

This configuration will help keep the head restraint region 32A at full deployment in a plate shape over an entire area in a front and rear direction. Without considering such an advantageous effect, the area of the shielding section to be supported by the supporting inflatable region may be partitioned from the gas feed channel. The head-protecting airbag apparatus M of the foregoing embodiment further includes the slippage prevention means that prevents the supporting inflatable region 23 from slipping upward at airbag deployment. Specifically, the supporting inflatable region 23 is so formed elongate in a front and rear direction as to stride over the two mounting portions 44A and 44B, out of the mounting portions 44 that are arranged along a front and rear direction on the upper edge 21c of the shielding section 21 for mounting the upper edge 21c on the inner panel 2, such that the mounting portions 44A and 44B act as the slippage prevention means. With this configuration, the mounting portions 44A and 44B are secured to the inner panel 2 above the supporting inflatable region 23 and prevent the supporting inflatable region 23 from slipping upward relative to the shielding section 21 and/or preventing the supporting inflatable region 23 from being located on an inboard side of the shielding section 21. As a result, the supporting inflatable region 23 will be steadily deployed between the vicinity of the upper end 21a of the shielding section 21 and inner panel 2 at airbag deployment.

Figure 11:
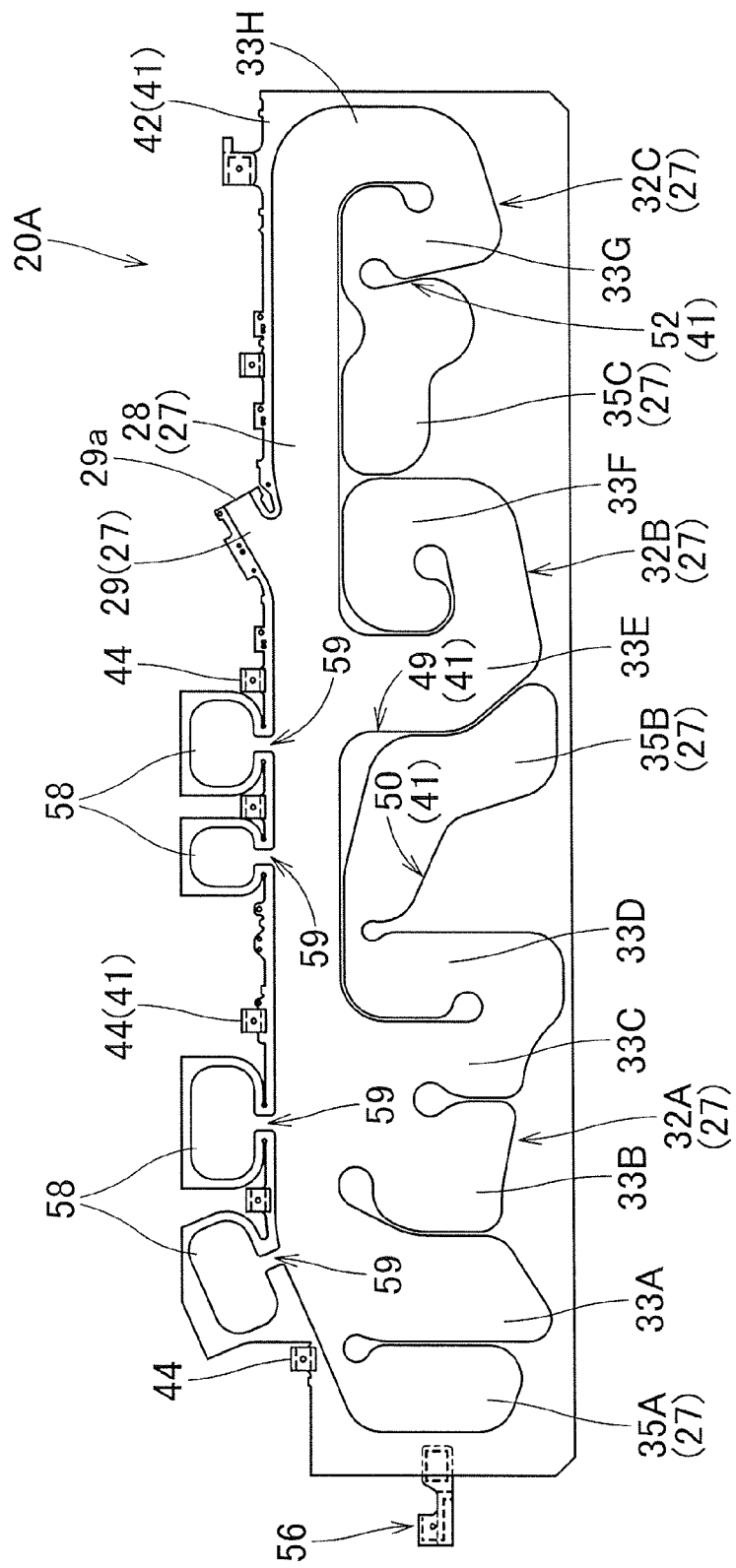
FIG. 11 is a front elevation of an alternative embodiment of the airbag of the invention in a flattened and developed state.

If such an advantageous effect does not have to be considered, the airbag may be configured like an airbag 20A shown in FIG. 11. The airbag 20A has a generally similar configuration to that of the airbag 20 except in an outer contour and location of the supporting inflatable region 58, and therefore, descriptions of common members will be omitted while assigning common reference numerals to the common members. A bag module 25A that forms the airbag 20A is provided with four, respectively separate supporting inflatable regions 58; above the vertical cell 33A of the head restraint region 32A, above the vertical cells 33B and 33C, above the auxiliary inflatable region 35B and above the vertical cell 33E of the head restraint region 32B. Each of the supporting inflatable regions 58 is in gas communication with the shielding section 21 (or gas feed channel 28) via a communication channel 59 that has a generally uniform width over an entire length.

Although the slippage prevention means of the airbag 20 in the foregoing embodiment is comprised of the mounting portions 44A and 44B located in the area of the supporting inflatable region 23, the slippage prevention means for preventing the supporting inflatable region 23 from slipping upward should not be limited thereby. By way of example, the supporting inflatable regions 58 of the airbag 20A may be joined to the outboard side of the shielding section 21 by an adhesive or the like such that the joint by the adhesive constitutes the slippage prevention means. Alternatively, there may be provided on a member of the vehicle body structure a projection that prevents upward movement of the supporting inflatable region, i.e., acts as the slippage prevention means.

In the foregoing embodiment, moreover, the communication channel 38 that makes the supporting inflatable region 23 communicate with the gas feed channel 28 (or shielding section 21) narrows toward the supporting inflatable region 23, in opening width or inside diameter, and the turn-round region 39 (or crease CL) is located in an intermediate position in a length direction of the communication channel 38. With this configuration, an inflation gas will pool in a wider area of the communication channel 38 located on the side of the shielding section 21 relative to the turn-round region 39 until the gas flows into the supporting inflatable region 23, and once an inner pressure rises, the gas will separate the panels (inner panel 27a and outer panel 27b) of the turn-round region 39 and flow into the supporting inflatable region 23 without delay in spite of the constricted outlet to the supporting inflatable region 23. As a result, the timing of inflow of an inflation gas into the supporting inflatable region 23 will be further stabilized. Without considering such an advantageous effect, the opening width or inside diameter of the communication channel may be generally uniform over an entire length like the communication channels 58 of the airbag 20A shown in FIG. 11.

Figure 12:
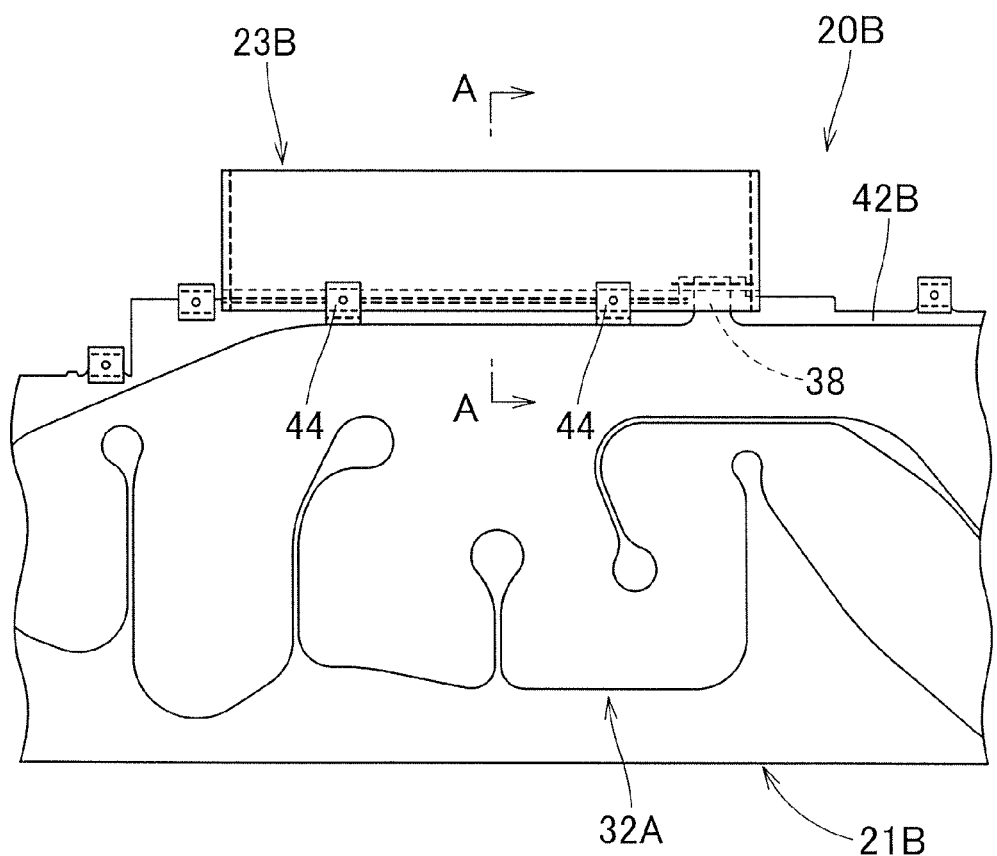
FIG. 12 is a partial enlarged front elevation of a further alternative embodiment of the airbag in a flattened and developed state.
Figure 12:
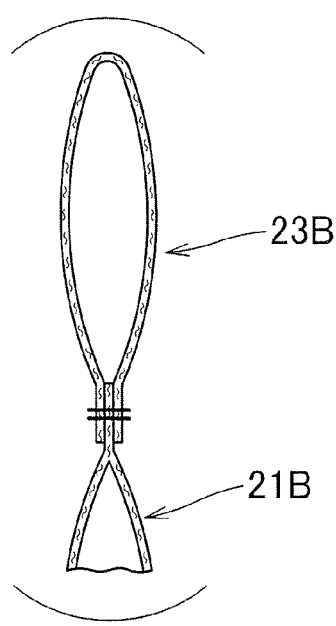

In the airbag 20/20A of the foregoing embodiments, the supporting inflatable region 23/58 is integral with the shielding section 21. However, the supporting inflatable region may be prepared separate from the shielding section, like an airbag 20B shown in FIG. 12. In the airbag 20B, only a shielding section 21B is made by hollow weaving while a supporting inflatable region 23B is separately prepared by sewing a pair of flexible woven cloths together by peripheral edges. The supporting inflatable region 23B thus prepared is sewn to and connected to a peripheral region 42B of the shielding section 21B. This configuration will reduce remaining materials which would be formed around the supporting inflatable region due to partial protrusion of the supporting inflatable region and discarded in comparison with an instance where the supporting inflatable region was integral with the shielding section, and therefore, will improve a material yield of the airbag.

Although the supporting inflatable region 23 of the airbag 20 is located only on an area deployable over the window W1, the location of the supporting inflatable region should not be limited thereby. The supporting inflatable region may also be so located as to be deployable over the window W1 and W2, and further the window W3. In order to prevent an ejection of an occupant in an assured manner, the supporting inflatable region is preferably located on an area of a window, not on an area of a pillar.

Although the supporting inflatable region 23 of the foregoing embodiment is configured to protrude from the roof side rail RR and cover the vicinity of the upper end of the window W1 at airbag deployment, the supporting inflatable region 23 is not required to be so long as to cover the window, but may also be configured to be just supported by the inner panel 2 (as a member of the vehicle body structure) only in an area of the roof side rail RR. To the contrary, the supporting inflatable region may also be even longer than the foregoing embodiment so as to cover a wider area of the window.

Although the airbag 20 of the foregoing embodiment has only one communication channel 38 for connecting the supporting inflatable region 23 and shielding section 21, the number of the communication channel between the supporting inflatable region and shielding section should not be limited thereby, but may be more. Providing more than one such communication channel can enable controlling of the timing of initiation of inflow of an inflation gas into the supporting inflatable region (i.e., by how much time the inflation of the supporting inflatable region should be delayed relative to the shielding section).

In the foregoing embodiment, as shown in FIG. 2, in a folded-up configuration of the airbag 20, the supporting inflatable region 23 is mounted around the folded-up shielding section 21. That is, the supporting inflatable region 23 is not folded up together with the shielding section 21. This configuration will enable the supporting inflatable region 23 to deploy on an outboard side of the shielding section 21 smoothly when the shielding section 21 inflates in an initial stage of airbag deployment. If such an advantageous effect does not have to be considered, however, the supporting inflatable region may be folded up together with the shielding section after being folded over the outboard side of the shielding section.

Furthermore, although the shielding section 21 of the foregoing embodiment is so configured that the lower edge 21b is located above the beltline BL of a vehicle at airbag deployment, it may also be configured to extend downward beyond the beltline BL.

Although the foregoing embodiments have been described as applied to the airbag apparatus for use in a vehicle with three rows of seats, the application of the present invention should not be limited thereby. The invention may also be applied to those mountable on a vehicle with two rows of seats, or a vehicle without any rear seats.

What is claimed is:

1. A head-protecting airbag apparatus mountable on a vehicle having a window, the airbag apparatus comprising an airbag adapted to be housed in an upper edge of the window in a folded-up configuration and deployable downward for covering an inboard side of the window when fed with an inflation gas, the airbag including:
   an inflatable shielding section that is adapted to be secured to a member of a vehicle body structure by an upper edge thereof in the upper edge of the window and covers the window at full airbag deployment;
   a supporting inflatable region that is in gas communication with the shielding section and deployable between an outboard side of a vicinity of an upper end of the shielding section and the member of the vehicle body structure in at least an upper area of the window, the supporting inflatable region inflating after the shielding section does and supporting the outboard side of the vicinity of the upper end of the shielding section; and
   delaying means that delays inflation of the supporting inflatable region relative to the shielding section, wherein
   the airbag further includes a communication channel that is generally tubular in shape and makes the supporting inflatable region communicate with the shielding section;
   in the airbag in a flattened and developed state before assembling into the airbag apparatus, the supporting inflatable region adjoins the shielding section having the communication channel interposed there between and the supporting inflatable region is folded over the outboard side of the shielding section on a crease that cuts across the communication channel;
   the delaying means is located in an area of the communication channel, and the delaying means is comprised of a turn-round region that is formed on the communication channel by said folding of the supporting inflatable region over the shielding section;
   the shielding section includes:
      a protection region that is located proximate a lower end of the shielding section at full deployment; and
      a gas feed channel that extends generally along a front and rear direction proximate an upper end of the shielding section at full deployment over a generally entire area in a front and rear direction of the shielding section for feeding an inflation gas to the protection region; and
   in the airbag in the flattened and developed state before assembling into the airbag apparatus, the communication channel protrudes upward from the upper edge of the shielding section above the gas feed channel; and
   the airbag further includes a plurality of mounting portions that are arranged along a front and rear direction on the upper edge of the shielding section for mounting the upper edge of the shielding section on the member of the vehicle body structure, the plurality of mounting portions being arranged to project upward from the upper edge of the shielding section.

2. The head-protecting airbag apparatus of claim 1, wherein the shielding section includes, in an area thereof overlapping with the supporting inflatable region, a communicating area that makes the gas feed channel communicate with the protection region in a vertical direction.

3. The head-protecting airbag apparatus of claim 1 wherein the airbag further includes means for preventing the supporting inflatable region from slipping upward at airbag deployment.

4. The head-protecting airbag apparatus of claim 3, wherein:
   the supporting inflatable region is so elongate in a front and direction as to stride over at least one of the mounting portions; and
   the mounting portion stridden by the supporting inflatable region acts as the means for preventing.

5. The head-protecting airbag apparatus of claim 1 wherein the communication channel narrows toward the supporting inflatable region and the turn-round region is located in an intermediate position in a length direction of the communication channel.

6. The head-protecting airbag apparatus of claim 1 wherein the supporting inflatable region is prepared separate from the shielding section.

7. The head-protecting airbag apparatus of claim 4, wherein
   each of the mounting portions is connected to the upper edge of the shielding section at the inboard side of the window from the crease folding the supporting inflatable region over the outboard side of the shielding section.

8. The head-protecting airbag apparatus of claim 7, wherein each of the mounting portions is connected to the upper edge of the shielding section by sewing.

* * * * *